United States Patent
Delgado Marquez et al.

(10) Patent No.: US 10,151,341 B2
(45) Date of Patent: Dec. 11, 2018

(54) LOAD-LIMITING THRUST BEARING SYSTEM AND AN ASSOCIATED METHOD THEREOF

(71) Applicant: General Electric Company, Schenectady, NY (US)

(72) Inventors: Adolfo Delgado Marquez, Niskayuna, NY (US); Jeremy Daniel Van Dam, West Coxsackie, NY (US); Stephen Masao Sakamoto, Edmond, OK (US); Rene Jose Garcia, Edmond, OK (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 562 days.

(21) Appl. No.: 14/837,008

(22) Filed: Aug. 27, 2015

(65) Prior Publication Data

US 2017/0058907 A1    Mar. 2, 2017

(51) Int. Cl.
| | |
|---|---|
| F16C 17/26 | (2006.01) |
| F16C 41/02 | (2006.01) |
| F16C 17/04 | (2006.01) |
| F16C 39/02 | (2006.01) |
| F04D 29/041 | (2006.01) |
| F04D 13/10 | (2006.01) |

(Continued)

(52) U.S. Cl.
CPC .............. *F16C 17/26* (2013.01); *F04D 13/10* (2013.01); *F04D 29/0413* (2013.01); *F16C 17/04* (2013.01); *F16C 39/02* (2013.01); *F16C 41/02* (2013.01); *F16C 17/06* (2013.01); *F16C 33/26* (2013.01)

(58) Field of Classification Search
CPC .......... F16C 17/04; F16C 17/26; F16C 33/26; F16C 39/02; F16C 41/02
See application file for complete search history.

(56) References Cited

U.S. PATENT DOCUMENTS

| | | | | |
|---|---|---|---|---|
| 1,421,082 A | * | 6/1922 | Hall ........................ | F16C 41/02 384/609 |
| 1,459,468 A | * | 6/1923 | Howarth ................. | F16C 17/06 384/304 |

(Continued)

OTHER PUBLICATIONS

"Bearings", Fundamentals of Design, Topic—10,, © 2008 Alexander Slocum, Jan. 1, 2008, 85 Pages.

*Primary Examiner* — James Pilkington
(74) *Attorney, Agent, or Firm* — GE Global Patent Operation; Pabitra Chakrabarti

(57) ABSTRACT

A system for distributing an axial load between load-limiting thrust bearing units is disclosed. The system includes a shaft disposed at least partially within a housing. Further, the system includes a first thrust collar and a second thrust collar axially spaced apart from each other and coupled to the shaft. The first thrust collar and/or the second thrust collar are disposed within the housing. The system further includes a first bearing unit disposed between the first thrust collar and a first side of the second thrust collar. The first bearing unit is disposed proximate to the first thrust collar. Further, the system includes a second bearing unit disposed proximate to a second side opposite to the first side of the second thrust collar. The system further includes a mechanical component disposed between the first bearing unit and the second bearing unit.

30 Claims, 8 Drawing Sheets

(51) Int. Cl.
 *F16C 17/06* (2006.01)
 *F16C 33/26* (2006.01)

(56) References Cited

U.S. PATENT DOCUMENTS

| | | | |
|---|---|---|---|
| 1,677,093 A * | 7/1928 | Johnson | F16C 17/06 |
| | | | 384/304 |
| 3,407,439 A | 10/1968 | Gregory | |
| 3,410,617 A | 11/1968 | Schaefer | |
| 4,033,647 A | 7/1977 | Beavers | |
| 4,350,911 A | 9/1982 | Wilson et al. | |
| 5,160,240 A | 11/1992 | Wilson | |
| 5,248,204 A | 9/1993 | Livingston et al. | |
| 7,830,055 B2 | 11/2010 | Arseneaux et al. | |
| 8,487,493 B2 | 7/2013 | Cunningham et al. | |
| 8,887,802 B2 | 11/2014 | Ghazi-Moradi et al. | |
| 2012/0273282 A1 | 11/2012 | Lin et al. | |
| 2016/0356275 A1* | 12/2016 | Delgado Marquez | F16C 17/26 |

\* cited by examiner

LOAD-LIMITING THRUST BEARING SYSTEM AND AN ASSOCIATED METHOD THEREOF

BACKGROUND

The present patent application relates generally to a bearing system, and, more particularly to a load-limiting thrust bearing system used in an apparatus such as an electrical submersible pump (ESP).

In a hydrocarbon reservoir, a fluid-lifting apparatus is generally used for transferring a production fluid from a wellbore to a higher elevation on the surface of the ground. One such fluid-lifting apparatus includes an electrical submersible pump (ESP) having a pump, a motor, and a seal unit.

During operation of the ESP, impellers rotate within the pump for transferring the production fluid from the wellbore. Generally, the rotating impellers exert a thrust load on the ESP and such a thrust load is supported by a thrust bearing unit disposed within the ESP. The thrust bearing unit with a larger diameter, has a greater load bearing capacity. However, the wellbore has a size constraint which in turn restrains the diameter of the thrust bearing unit which can be used in the ESP, thereby affecting the load bearing capacity of the thrust bearing unit. In such a scenario, a backup thrust bearing unit may be used to enhance the load bearing capacity. However, existing bearing arrangements have not been sufficient to properly distribute and/or regulate the thrust load between the thrust bearing units, resulting in either overloading or uneven wear and tear of the thrust bearing unit.

Accordingly, there is a need for an improved bearing system and an associated method for distributing and regulating an axial thrust load between a plurality of thrust bearing units.

BRIEF DESCRIPTION

In accordance with one exemplary embodiment, a bearing system is disclosed. The bearing system includes a shaft disposed at least partially within a housing. Further, the bearing system includes a first thrust collar and a second thrust collar axially spaced apart from each other and coupled to the shaft. At least one of the first thrust collar and the second thrust collar is disposed within the housing. The bearing system further includes a first bearing unit disposed between the first thrust collar and a first side of the second thrust collar. The first bearing unit is disposed proximate to the first thrust collar. Further, the bearing system includes a second bearing unit disposed proximate to a second side opposite to the first side of the second thrust collar. A mechanical component is disposed between the first bearing unit and the second bearing unit.

In accordance with another exemplary embodiment, an apparatus is disclosed. The apparatus includes a pump, a motor, and a seal unit disposed between and coupled to the pump and the motor. The seal unit includes a casing and a bearing system disposed within the casing. The bearing system includes a housing coupled to the casing. A shaft is disposed at least partially within the housing and coupled to the pump and the motor. Further, the bearing system includes a first thrust collar and a second thrust collar axially spaced apart from each other and coupled to the shaft. At least one of the first thrust collar and the second thrust collar is disposed within the housing. The bearing system further includes a first bearing unit disposed between the first thrust collar and a first side of the second thrust collar. The first bearing unit is disposed proximate to the first thrust collar. Further, the bearing system includes a second bearing unit disposed proximate to a second side opposite to the first side of the second thrust collar. A mechanical component is disposed between the first bearing unit and the second bearing unit.

In accordance with yet another exemplary embodiment, a method is disclosed. The method involves applying the axial thrust load on a bearing system having a shaft, a first thrust collar, a second thrust collar, a first bearing unit, a second bearing unit, and a mechanical component. The shaft is disposed at least partially within a housing. The first thrust collar and the second thrust collar are axially spaced apart from each other and coupled to the shaft. At least one of the first thrust collar and the second thrust collar is disposed within the housing. The first bearing unit is disposed between the first thrust collar and a first side of the second thrust collar. The first bearing unit is disposed proximate to the first thrust collar. The second bearing unit is disposed proximate to a second side opposite to the first side of the second thrust collar. The mechanical component is disposed between the first bearing unit and the second bearing unit. The method further involves moving one among the first bearing unit and the second bearing unit via the mechanical component, along an axial direction of the shaft and distributing the axial thrust load between the first bearing unit and the second bearing unit.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments discussed herein disclose a bearing system, for example, a load-limiting thrust bearing system for an apparatus such as an electrical submersible pump (ESP). The exemplary bearing system is designed for distributing and regulating an axial load between a first bearing unit and a second bearing unit which are disposed axially in tandem along a shaft of the ESP. In certain embodiments of the present invention, the bearing system includes a shaft disposed at least partially within a housing. Further, the bearing system includes a first thrust collar and a second thrust collar axially spaced apart from each other and coupled to the shaft, where at least one of the first thrust collar and the second thrust collar is disposed within the housing. The bearing system further includes a first bearing unit disposed between the first thrust collar and a first side of the second thrust collar, where the first bearing unit is disposed proximate to the first thrust collar. Further, the bearing system includes a second bearing unit disposed proximate to a second side opposite to the first side of the second thrust collar and a mechanical component disposed between the first bearing unit and the second bearing unit.

Figure 1:
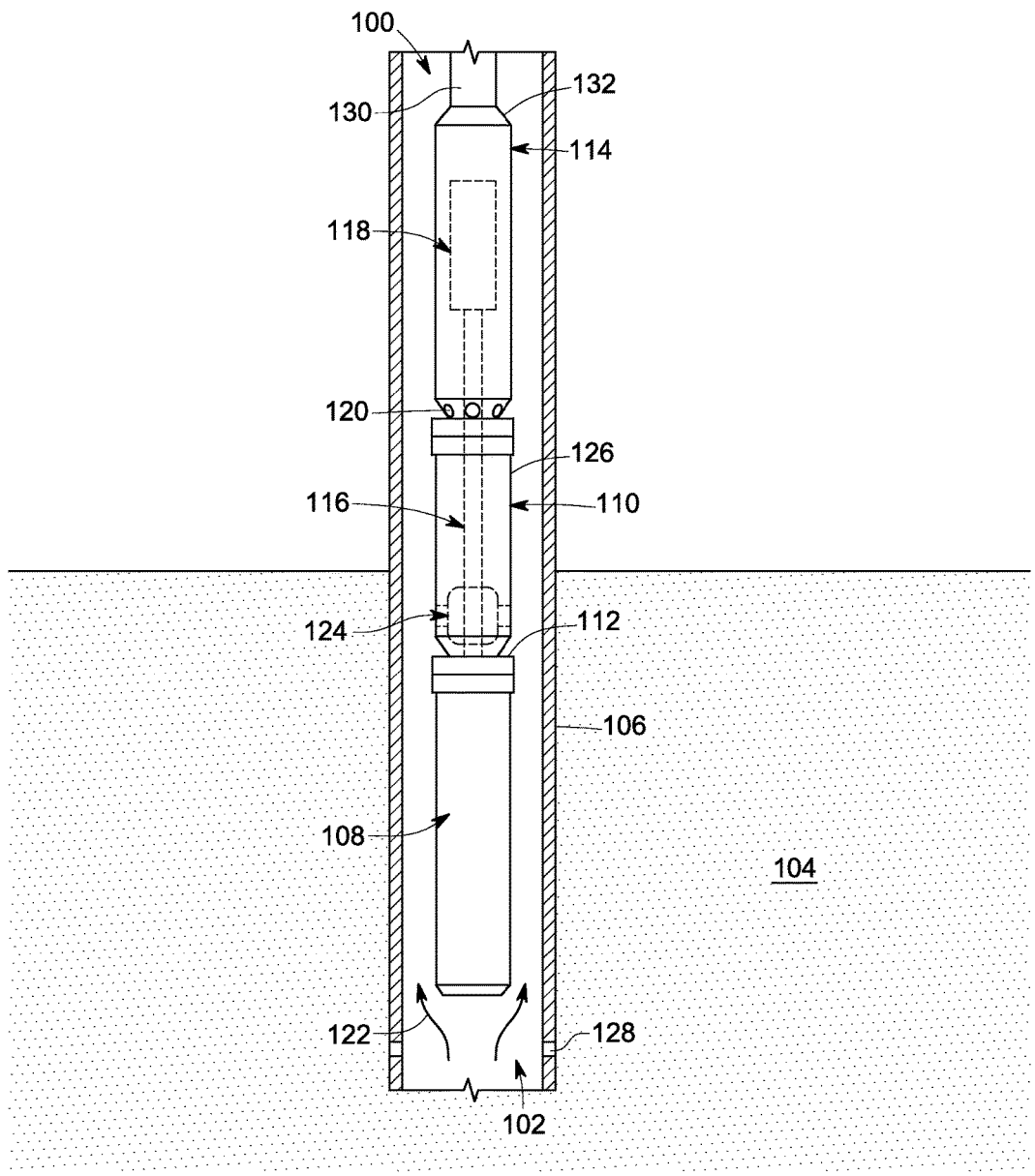
FIG. 1 is a schematic sectional view of an electrical submersible pump disposed in a wellbore in accordance with one exemplary embodiment.

FIG. 1 illustrates a schematic sectional view of an apparatus 100 in accordance with one exemplary embodiment. In the embodiment shown, the apparatus 100 is an electrical submersible pump (ESP). It should be noted herein that the terms "apparatus" and "ESP" may be used interchangeably. In certain other embodiments, the apparatus 100 may be a drilling machine, a turbo machine, a rotor bearing system, or the like. The illustrated embodiment of the apparatus 100 should not be construed as a limitation of the present invention.

The ESP 100 is disposed within a wellbore casing 106 of a wellbore 102 inserted in a hydrocarbon reservoir 104. In the illustrated embodiment, the ESP 100 includes a motor 108, a seal unit 110 coupled to an upper end portion 112 of the motor 108, and a pump 114 disposed above and coupled to the seal unit 110. The ESP 100 further includes a shaft 116 extending from the motor 108 to the pump 114 through the seal unit 110. Specifically, one end of the shaft 116 is coupled to the motor 108 and another end of the shaft 116 is coupled to an impeller 118 disposed within the pump 114. Although the shaft 116 is shown as a single member in the embodiment shown, it should be noted herein that the shaft 116 may include a plurality of segments.

The pump 114 further includes a plurality of fluid inlets 120 for feeding a production fluid 122 from the wellbore 102. The ESP 100 may optionally include a liquid-gas separator (not shown in FIG. 1) disposed between the seal unit 110 and the pump 114, which may be configured to separate a liquid phase from a gaseous phase of the production fluid 122. In such embodiments, only the liquid phase is fed to the pump 114 via the plurality of fluid inlets 120.

The seal unit 110 is configured to equalize pressure between an interior of the motor 108 and the wellbore 102, to absorb thrust generated by the shaft 116 and compensate for the thermal expansion of a motor lubricant (not shown in FIG. 1), to prevent the production fluid 122 from entering an interior of the motor 108. In one embodiment, the ESP 100 further includes a bearing system 124 disposed within the seal unit 110. Specifically, the bearing system 124 is disposed surrounding the shaft 116 and coupled to a casing 126 of the seal unit 110. In certain embodiments, the bearing system 124 includes a thrust bearing unit such as a tilting-pad and/or a fixed-pad thrust bearing. In certain other embodiments, the bearing system 124 may be disposed within the motor 108 or within the pump 114 depending on the application and design criteria. The seal unit 110 absorbs an axial thrust generated by the pump 114 and dissipates heat generated by the bearing system 124.

During operation, the production fluid 122 which may include liquid hydrocarbon, gas hydrocarbon, and/or water, enters the wellbore 102 from the hydrocarbon reservoir 104, through perforations 128 formed in the wellbore casing 106. The motor 108 is driven by a power source (not shown in FIG. 1) causing the shaft 116 to rotate resulting in rotation of the impeller 118. The production fluid 122 in the wellbore 102, is fed to the pump 114 through the plurality of fluid inlets 120. The production fluid 122 is pressurized by the rotating impeller 118 and transported to a distant storage facility at a higher elevation (not shown in FIG. 1) via one or more pipes 130 coupled to an upper end portion 132 of the pump 114. The rotating impeller 118 exerts a downward thrust load. The bearing system 124 is configured to support such a downward thrust load by distributing and regulating the thrust load between a plurality of thrust bearings (not shown in FIG. 1).

Figure 2:
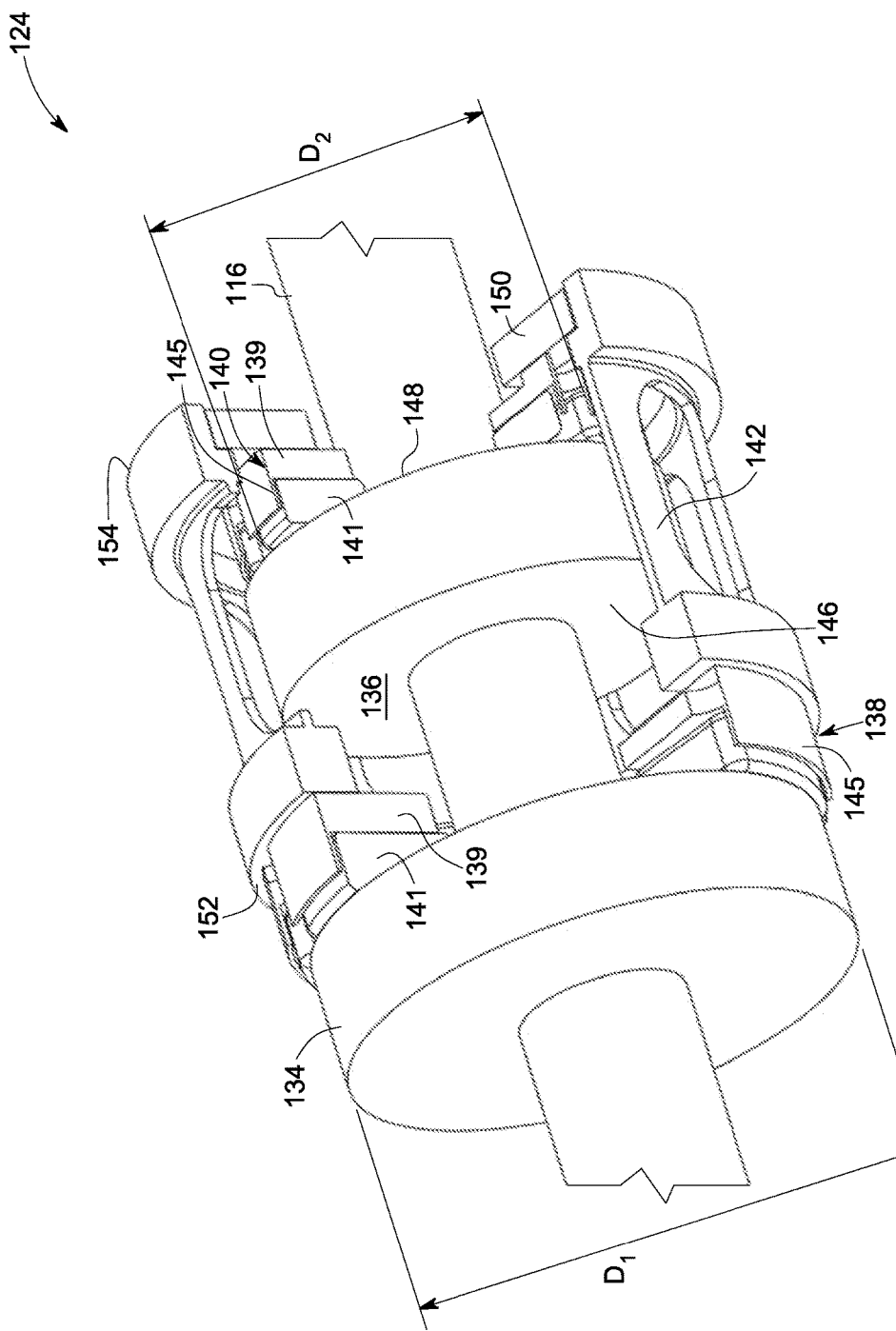
FIG. 2 is a perspective view of a bearing system in accordance with one exemplary embodiment of the present invention.

FIG. 2 illustrates a perspective view of the bearing system 124 in accordance with one exemplary embodiment. The bearing system 124 includes the shaft 116, a first thrust collar 134, a second thrust collar 136, a first bearing unit 138, a second bearing unit 140, a mechanical component 142, and a plate 150. In the illustrated embodiment, only a portion of the first bearing unit 138, the second bearing unit 140, the mechanical component 142, and the plate 150 are shown to simplify the illustration of the bearing system 124. In certain embodiments, the bearing system 124 may include more than two bearing units and thrust collars, depending on the application and design criteria. The illustrated embodiment should not be construed as a limitation of the present invention.

The bearing system 124 further includes a housing (not shown in FIG. 2) enclosing at least one of the first thrust collar 134 and the second thrust collar 136. In such embodiments, the shaft 116 is disposed at least partially within the housing and coupled to the motor 108 and the pump 114 (as shown in FIG. 1).

The first thrust collar 134 and the second thrust collar 136 are axially spaced apart from each other and coupled to the shaft 116. The first and second thrust collars 134, 136 are annular components and configured to rotate and move co-axially with the shaft 116. The first bearing unit 138 is disposed between the first thrust collar 134 and a first side 146 of the second thrust collar 136. The first bearing unit 138 is located proximate to the first thrust collar 134. The second bearing unit 140 is located proximate to a second side 148 opposite to the first side 146 of the second thrust collar 136. Each of the first bearing unit 138 and the second bearing unit 140, includes a thrust bearing 145 arranged in a form of a plurality of sectors. Each thrust bearing 145 includes a metal base 139 and a pad 141. In one embodiment, the pad 141 is rigidly coupled to the metal base 139 to form a fixed-pad thrust bearing. In another embodiment, the pad 141 is rotatable about one or more ridges or pivot structures (not shown in FIG. 2) of the metal base 139 to form a tilting-pad thrust bearing. In the illustrated embodiment, the pad 141 of the first bearing unit 138 contacts the first thrust collar 134. The pad 141 of the second bearing unit 140 is disposed proximate to the second side 148 of the second thrust collar 136 and the metal base 139 of the second bearing unit 140 is coupled to the plate 150. In one or more embodiments, the plate 150 may be further coupled to the housing. In one embodiment, the plate 150 is a stationary plate coupled to and disposed around the shaft 116.

The first bearing unit 138 has a first diameter "$D_1$" and the second bearing unit 140 has a second diameter "$D_2$" different from the first diameter "$D_1$". In the embodiment shown, the first diameter "$D_1$" is greater than the second diameter "$D_2$". In another embodiment, the first diameter "D1" may be approximately equal to the second diameter "D2", depending on the application and design criteria. The number of the thrust bearings in the first and second bearing units 138, 140 may vary depending on the application and design criteria. In one embodiment, the first thrust collar 134 has a diameter substantially equal to the first diameter "$D_1$" of the first bearing unit 138 and the second thrust collar 136 has a diameter approximately equal to the second diameter "$D_2$" of the second bearing unit 140.

The mechanical component 142 is disposed between the first bearing unit 138 and the second bearing unit 140. In the illustrated embodiment, the mechanical component 142 is a flexible biasing element. In the illustrated embodiment, the metal base 139 of the first bearing unit 138 is coupled to a first end 152 of the mechanical component 142 and the plate 150 is coupled to a second end 154 of the mechanical component 142. The mechanical component 142 is discussed in greater detail below.

Figure 3:
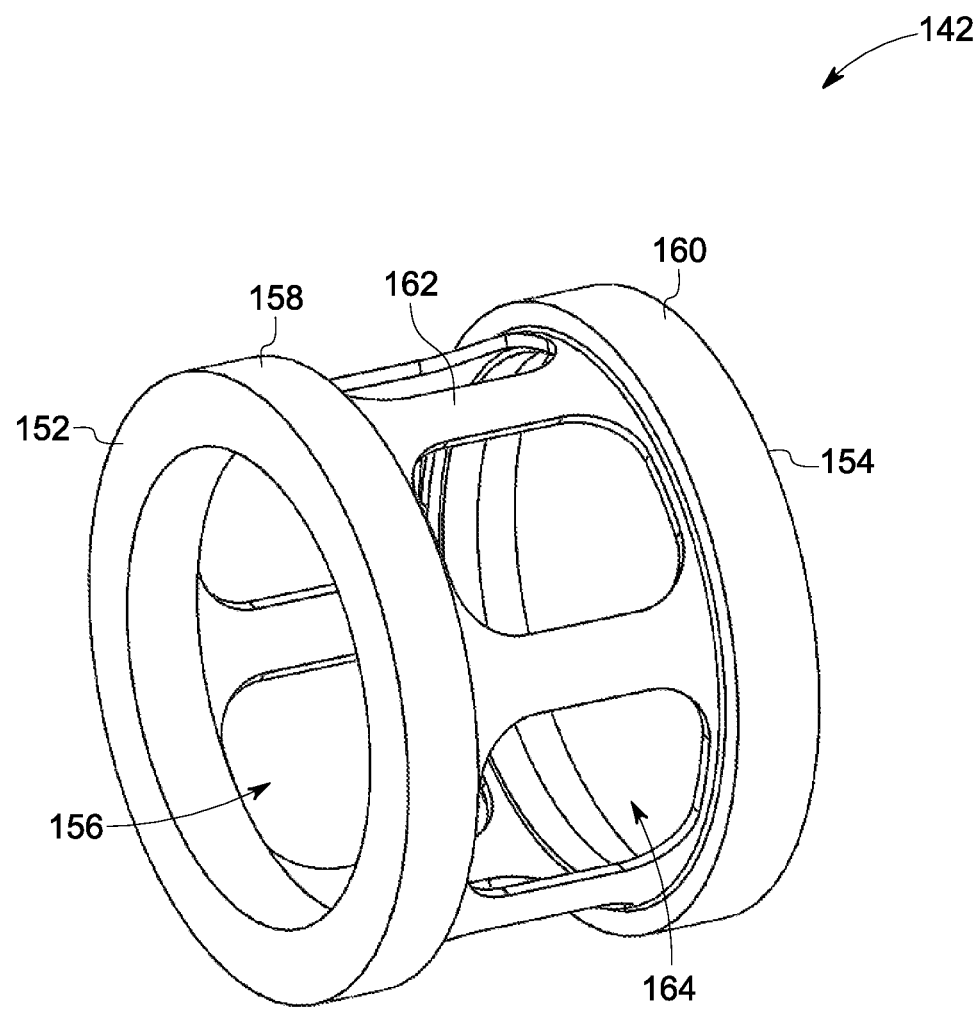
FIG. 3 is a perspective view of a mechanical component in accordance with one exemplary embodiment of the present invention.

FIG. 3 illustrates a perspective view of the mechanical component 142 in accordance with one exemplary embodiment. In the illustrated embodiment, the mechanical component 142 has a cylindrical shape with a through axial opening 156. The mechanical component 142 includes a first side wall 158, a second side wall 160, and a plurality of intermediate walls 162. The first side wall 158 is coupled to the second side wall 160 through the plurality of intermediate walls 162. The plurality of intermediate walls 162 are spaced apart from each other to define a plurality of slots 164 along a circumference of the mechanical component 142. The first side wall 158 includes a first end 152 coupled to the metal base 139 of the first bearing unit 138 (as shown in FIG. 2). The second side wall 160 includes a second end 154 coupled to the plate 150 (as shown in FIG. 2).

In the illustrated embodiment, the mechanical component 142 is a flexible biasing element. The flexibility of the mechanical component 142 is generally defined by the number of slots 164 and materials of the mechanical component 142. During operation, the mechanical component 142 is configured to deform or move axially for biasing the second bearing unit 140 against the second thrust collar 136. In certain other embodiments, the mechanical component 142 may be rigid lever arms with fulcrum points positioned to act as a similar biasing element.

Figure 4:
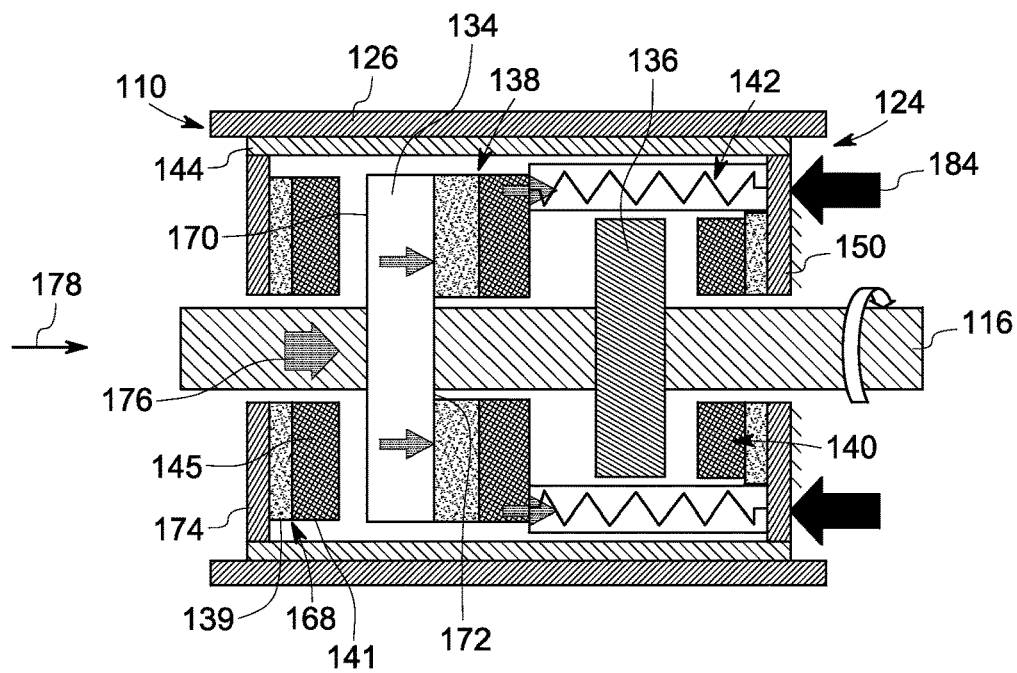
FIG. 4 is a schematic view of a seal unit having a bearing system in accordance with one exemplary embodiment.

FIG. 4 illustrates a schematic view of the seal unit 110 having the bearing system 124 in accordance with one exemplary embodiment.

The bearing system 124 includes a housing 144 enclosing the first thrust collar 134 and the second thrust collar 136 therein. The housing 144 is rigidly coupled to a casing 126 of the seal unit 110. The shaft 116 is disposed at least partially within the housing 144 and coupled to the motor 108 and the pump 114 (as shown in FIG. 1). The first bearing unit 138 is disposed proximate to a second side 172 opposite to a first side 170 of the first thrust collar 134. The second bearing unit 140 is coupled to the housing 144 via the plate 150. The mechanical component 142 is coupled to the plate 150 and the first bearing unit 138. The bearing system 124 further includes a third bearing unit 168 disposed proximate to the first side 170 of the first thrust collar 134. The thrust bearing 145 may either be a fixed-pad thrust bearing or a tilting-pad thrust bearing depending on the application and design criteria. Each thrust bearing 145 includes a metal base 139 and a pad 141. The metal base 139 is further coupled to the housing 144 via a stationary element 174.

During operation of the ESP, an axial thrust load 176 is applied by the rotating impellers 118 of the pump 114 (as shown in FIG. 1) on the bearing system 124 via the shaft 116. The axial thrust load 176 moves the shaft 116 axially along a first direction 178 and hence the first thrust collar 134 is engaged with the first bearing unit 138. The first bearing unit 138 then transmits the axial thrust load 176 to the mechanical component 142. The axial thrust load 176 is initially resisted by the mechanical component 142, the plate 150, and the housing 144 by applying a reactive axial thrust 184. As a result, the axial thrust load 176 applied on the bearing system 124, is primarily supported by the first bearing unit 138 until the axial thrust load 176 is equal to a pre-defined load bearing capacity of the first bearing unit 138. The second bearing unit 140 is not biased against the second thrust collar 136 until an actual load bearing capacity of the first bearing unit 138 exceeds the pre-defined load bearing capacity of the first bearing unit 138. In one embodiment the term "an actual axial thrust load" is referred to as a thrust load applied on the first bearing unit 138 of the bearing system 124 and the term "a pre-defined load bearing capacity" is referred to as a maximum thrust load bearing capacity of the first bearing unit 138 as indicated by the manufacturer of the bearing system 124.

Figure 5:
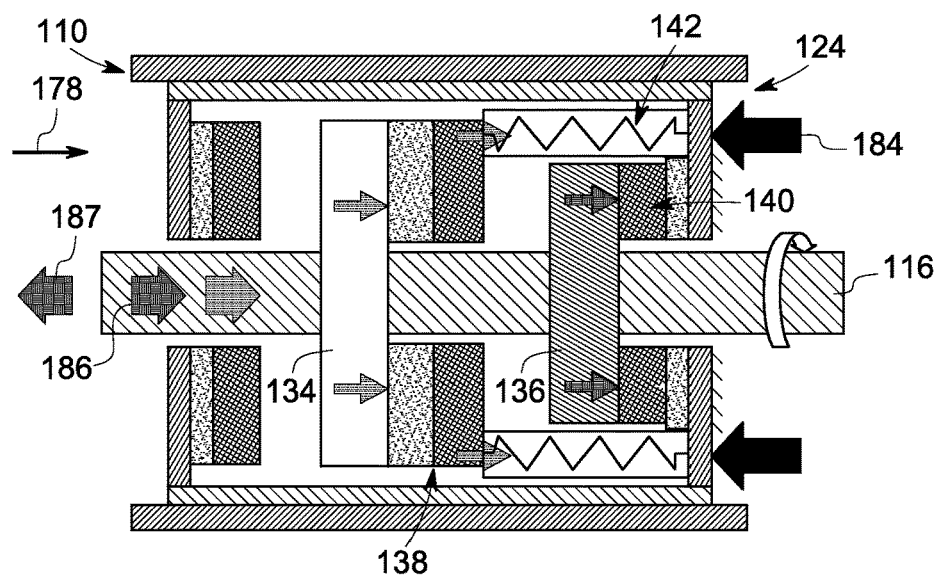
FIG. 5 is a schematic view of the seal unit having the bearing system in accordance with an exemplary embodiment of FIG. 4.

FIG. 5 illustrates a schematic view of the seal unit 110 having the bearing system 124 in accordance with the exemplary embodiment of FIG. 4.

During operation of the ESP, an excessive axial thrust load 186 applied on the bearing system 124, is transmitted from the first bearing unit 138 to the second bearing unit 140 via the mechanical component 142. In one embodiment, the term "an excessive axial thrust load" is referred to as an axial thrust load exceeding a pre-defined load bearing capacity of the first thrust bearing 138. The first thrust collar 134 and the first bearing unit 138 moves the mechanical component 142 axially along the first direction 178 causing the mechanical component 142 to compress axially along the shaft 116. The compression of the mechanical component 142 causes the second thrust collar 136 to move axially and contact the second bearing unit 140. As a result, the axial thrust loads 176, 186 are distributed between the first and second bearing units 138, 140. Further, during the operation of the ESP, when the excessive axial thrust load 186 is less than the pre-defined load bearing capacity of the first bearing unit 138, the mechanical component 142 is expanded. As a result, the second bearing unit 140 is disengaged from the second thrust collar 136, thereby regulating the distribution of the axial thrust loads 176, 186 between the first and second bearing units 138, 140.

In one exemplary embodiment, the first thrust collar 134 is pushed axially to move the second thrust collar 136 axially to contact the second bearing unit 140. The third bearing unit 168 may contact the first thrust collar 134 during transient operating conditions of the ESP. Specifically, the third bearing unit 168 may be configured to support an upward thrust 187 generated by the pump 114 (as shown in FIG. 1) during startup of the ESP.

Figure 6:
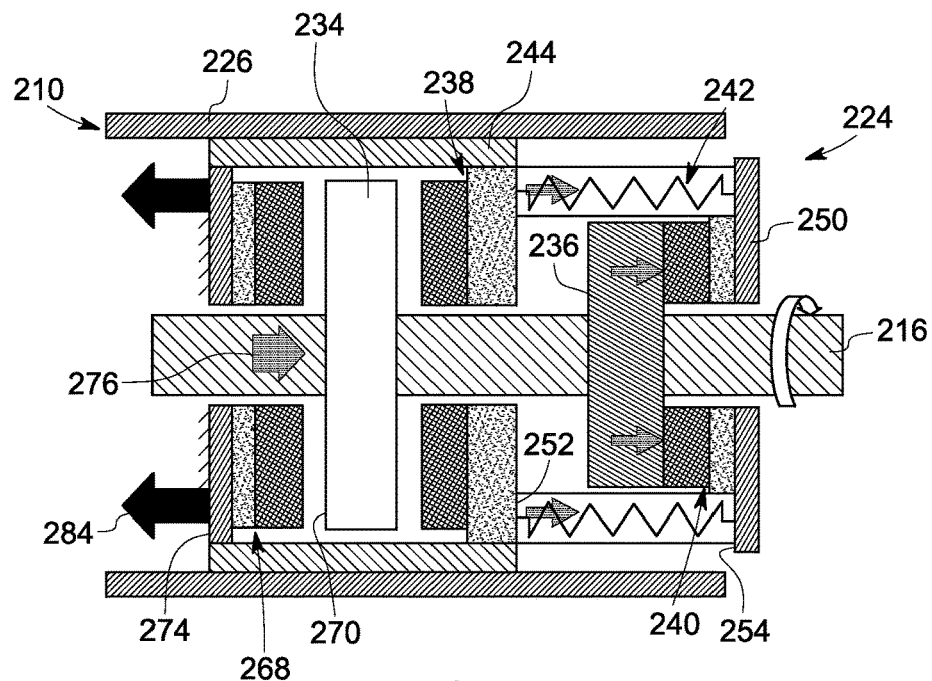
FIG. 6 is a schematic view of a seal unit having a bearing system in accordance with another exemplary embodiment of the present invention.

FIG. 6 illustrates a schematic view of a seal unit 210 having a bearing system 224 in accordance with another exemplary embodiment.

The bearing system 224 includes a shaft 216, a first thrust collar 234, a second thrust collar 236, a first bearing unit 238, a second bearing unit 240, and a mechanical component 242. The bearing system 224 further includes a housing 244 enclosing the first thrust collar 234 and coupled to a casing 226. The shaft 216 is disposed partially within the housing 244. The first bearing unit 238 is disposed proximate to the first thrust collar 234 and coupled to the housing 244. The second bearing unit 240 contacts the second thrust collar 236 and coupled to a plate 250. In one embodiment, the plate 250 may move axially along with the shaft 216. The mechanical component 242 is disposed between the first bearing unit 238 and the plate 250. A first end 252 of the mechanical component 242 is coupled the first bearing unit 238 and a second end 254 of the mechanical component 242 is coupled to the plate 250. The bearing system 224 includes a third bearing unit 268 disposed proximate to a first side 270 of the first thrust collar 234 and coupled to the housing 244 via a stationary element 274.

During operation of an electrical submersible pump, an axial thrust load 276 is applied on the bearing system 224 causing the shaft 216 to move axially and engage the second thrust collar 236 with the second bearing unit 240. The second bearing unit 240 then transmits the axial thrust load 276 to the mechanical component 242 via the plate 250. The axial thrust load 276 is initially resisted by the mechanical component 242 and the housing 244 by applying a reactive axial thrust load 284. The axial thrust load 276 is primarily supported by the second bearing unit 240 until the axial thrust load is equal to a pre-defined load bearing capacity of the second bearing unit 240. The first bearing unit 238 is not biased against the first thrust collar 234 until an actual load bearing capacity of the second bearing unit 240 is greater than the pre-defined load bearing capacity of the second bearing unit 240.

Figure 7:
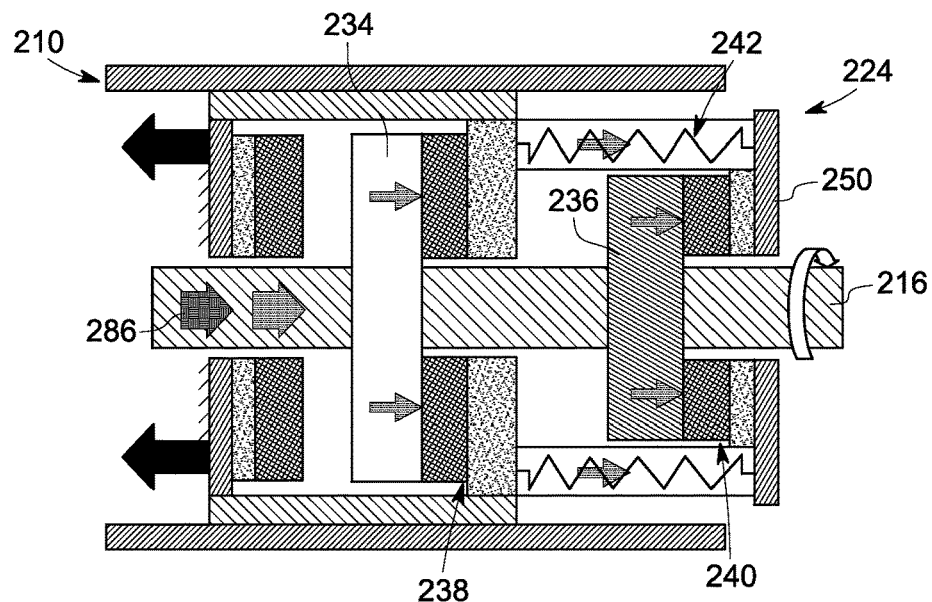
FIG. 7 is a schematic view of the seal unit having the bearing system in accordance with the exemplary embodiment of FIG. 6.

FIG. 7 illustrates a schematic view of the seal unit 210 having the bearing system 224 in accordance with the exemplary embodiment of FIG. 6. During operation of the electrical submersible pump, an excessive axial thrust load 286 applied on the bearing system 224, is transmitted from the second bearing unit 240 to the first bearing unit 238 via the mechanical component 242. The second thrust collar 236 and the second bearing unit 240 moves the mechanical component 242 and the plate 250 axially, thereby causing the mechanical component 242 to expand axially to allow the downward movement of the shaft 216. The expansion of the mechanical component 242 causes the first thrust collar 234 to move axially and contact the first bearing unit 238. As a result, the axial thrust loads 276, 286 are distributed between the first and second bearing units 238, 240. Further, during the operation of the electrical submersible pump, when the excessive axial thrust load 286 is less than the pre-defined load bearing capacity of the second bearing unit 240, the mechanical component 242 is compressed. As a result, the first bearing unit 238 is disengaged from the first thrust collar 234, thereby regulating the distribution of the axial thrust loads 276, 286 between the first and second bearing units 238, 240. In one exemplary embodiment, the plate 250 is pushed axially to move the first thrust collar 234 axially to contact the first bearing unit 238.

Figure 8:
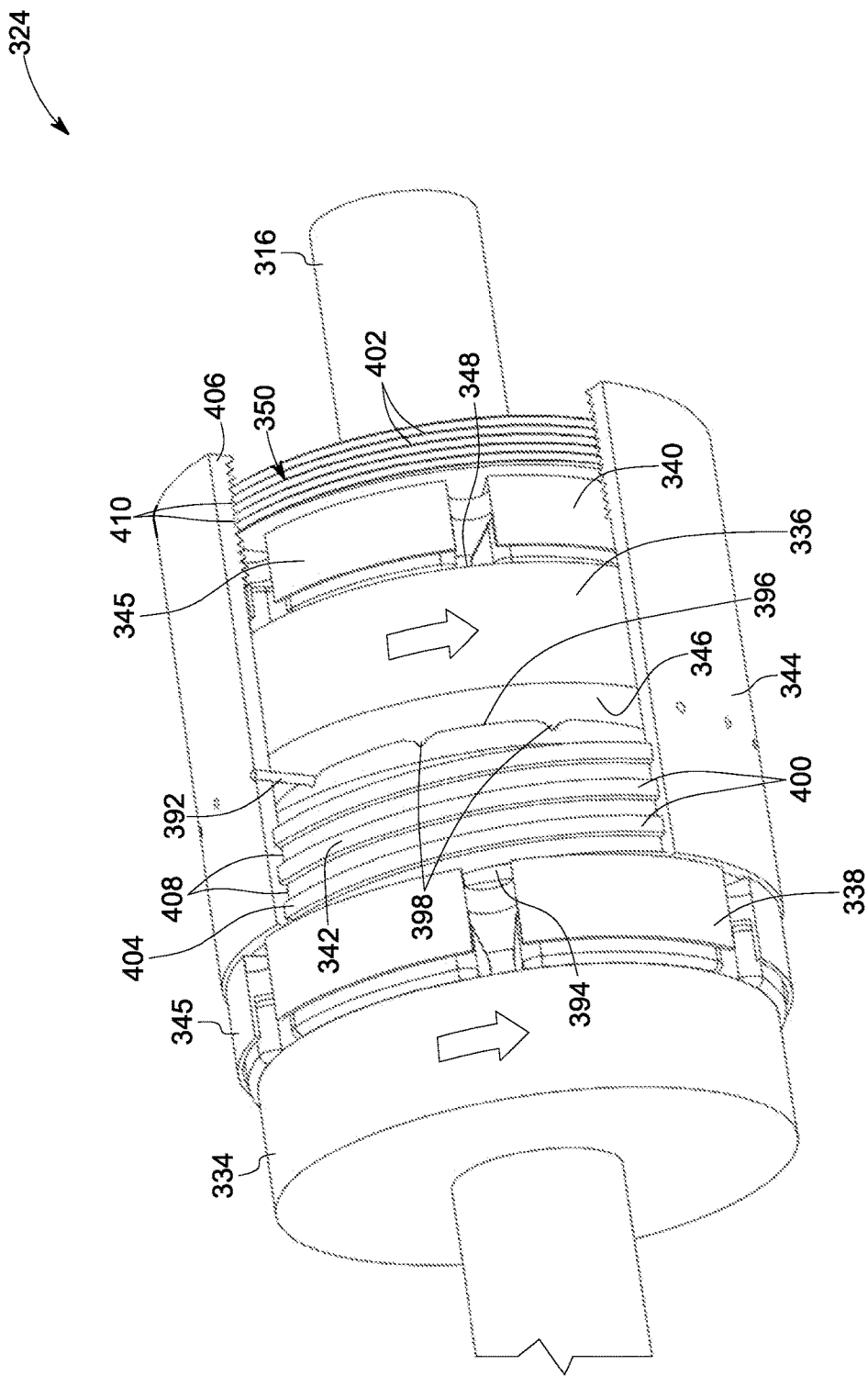
FIG. 8 is a perspective view of a bearing system in accordance with yet another exemplary embodiment of the present invention.

FIG. 8 illustrates a perspective view of a bearing system 324 in accordance with another exemplary embodiment. The bearing system 324 includes a shaft 316, a first thrust collar 334, a second thrust collar 336, a first bearing unit 338, a second bearing unit 340, and a mechanical component 342. In certain embodiments, the bearing system 324 may include more than two bearing units and thrust collars, depending on the application and design criteria.

The bearing system 324 further includes a housing 344, a plate 350, and a flexible biasing element 392. In the illustrated embodiment, only a portion of the housing 344 is shown to simplify the illustration of the bearing system 324. The second thrust collar 336 is disposed within the housing 344. The shaft 316 is disposed at least partially within the housing 344 and may be coupled to the motor and the pump.

The first thrust collar 334 and the second thrust collar 336 are axially spaced apart from each other and coupled to the shaft 316. The first bearing unit 338 is coupled to the mechanical component 342, and is disposed between the first thrust collar 334 and a first side 346 of the second thrust collar 336. Specifically, the first bearing unit 338 contacts the first thrust collar 334. The second bearing unit 340 is located proximate to a second side 348 opposite to a first side 346 of the second thrust collar 336.

In one embodiment, the mechanical component 342 is a power screw element. The mechanical component 342 includes a first set of screw elements 400 having a first peripheral side wall 394 and a second peripheral side wall 396. The first peripheral side wall 394 is coupled to the first bearing unit 338. The second peripheral side wall 396 is disposed proximate to the first side 346 of the second thrust collar 336. The second peripheral side wall 396 includes a plurality of grooves 398 spaced apart from each other.

The plate 350 is a threaded support plate having a plurality of first screw elements 402. The plate 350 is rotatable and disposed around the shaft 316. The housing 344 includes a first end portion 404 having a second set of screw elements 408 and a second end portion 406 having a plurality of second screw elements 410. The second set of screw elements 408 is engaged to the first set of screw elements 400. The plurality of second screw elements 410 is engaged with the plurality of first screw elements 402. The plurality of first and second screw elements 402, 410 are used to adjust the position of the plate 350 relative to the second thrust bearing unit 340.

In the illustrated embodiment, the flexible biasing element 392 is a flexible pin. The flexible biasing element 392 is rotatably coupled to the housing 344 and the mechanical component 342. Specifically, the flexible pin 392 is coupled to the groove 398 and is configured to flex/bend during rotation of the mechanical component 342. In some embodiments, the bearing system 324 includes a plurality of flexible biasing elements and in such embodiments each flexible biasing element is coupled to the groove in the plurality of grooves. The flexible biasing elements 392 may include spring elements, such as, coil springs, pneumatic springs, elastomeric springs, or the like.

Figure 9:
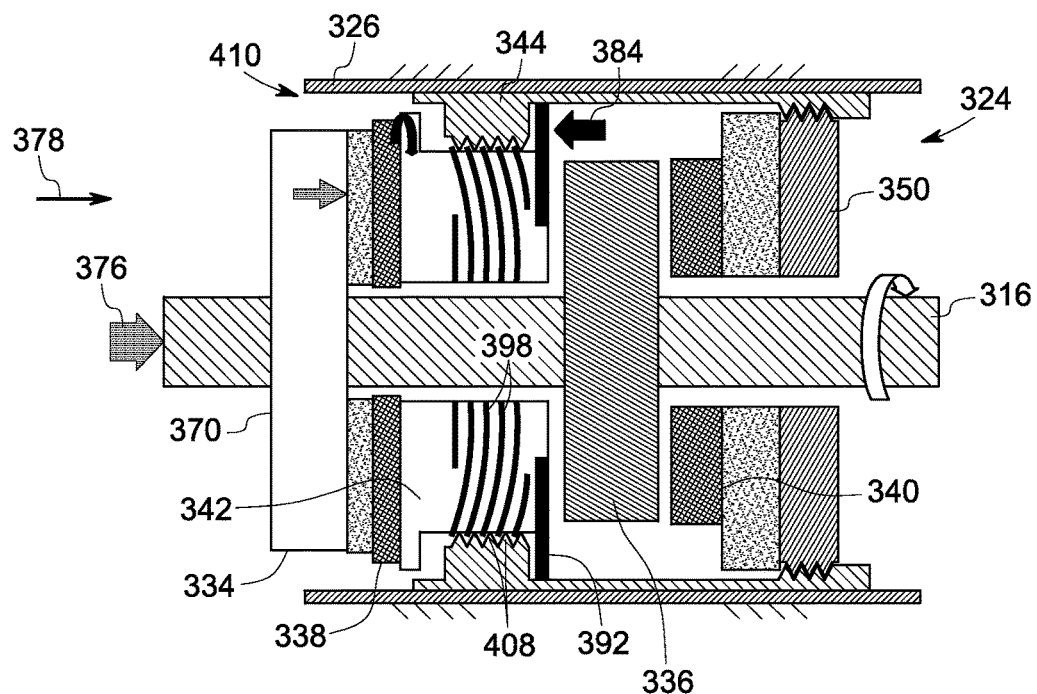
FIG. 9 is a schematic view of a seal unit having the bearing system in accordance with the exemplary embodiment of FIG. 8.

FIG. 9 is a schematic view of a seal unit 410 having the bearing system 324 in accordance with the exemplary embodiment of FIG. 8.

The housing 344 is rigidly coupled to a casing 326. The shaft 316 is disposed at least partially within the housing 344 and coupled to a motor and a pump. The second bearing unit 340 is coupled to the housing 344 via the threaded support plate 350. The mechanical component 342 is coupled to the first bearing unit 338 and disposed between the first bearing unit 338 and the second thrust collar 336. The first bearing unit 338 is disposed contacting the first thrust collar 334. The second bearing unit 340 is disposed proximate to the second thrust collar 336. The first set of screw elements 398 of the mechanical component 342 is engaged with the second set of screw elements 408 of the housing 344. The bearing system 324 may further include a third bearing unit (not shown in FIG. 9) disposed proximate to a first side 370 of the first thrust collar 334.

During operation of an electrical submersible pump, an axial thrust load 376 is applied on the bearing system 324 via the shaft 316. The axial thrust load 376 moves the shaft 316 axially along a first direction 378 and engages the first thrust collar 334 with the first bearing unit 338. The first bearing unit 338 rotates the mechanical component 342 and transmits the axial thrust load 376 to the mechanical component 342. The axial thrust load 376 is initially resisted by the mechanical component 342 and the flexible biasing element 392 by applying a reactive axial thrust load 384. The axial thrust load 376 applied on the bearing system 324, is primarily supported by the first bearing unit 338 until the axial thrust load 376 is equal to a pre-defined load bearing capacity of the first bearing unit 338. The second bearing unit 340 is not biased against the second thrust collar 336 until an actual load bearing capacity of the first bearing unit 338 exceeds the pre-defined load bearing capacity of the first bearing unit 338.

Figure 10:
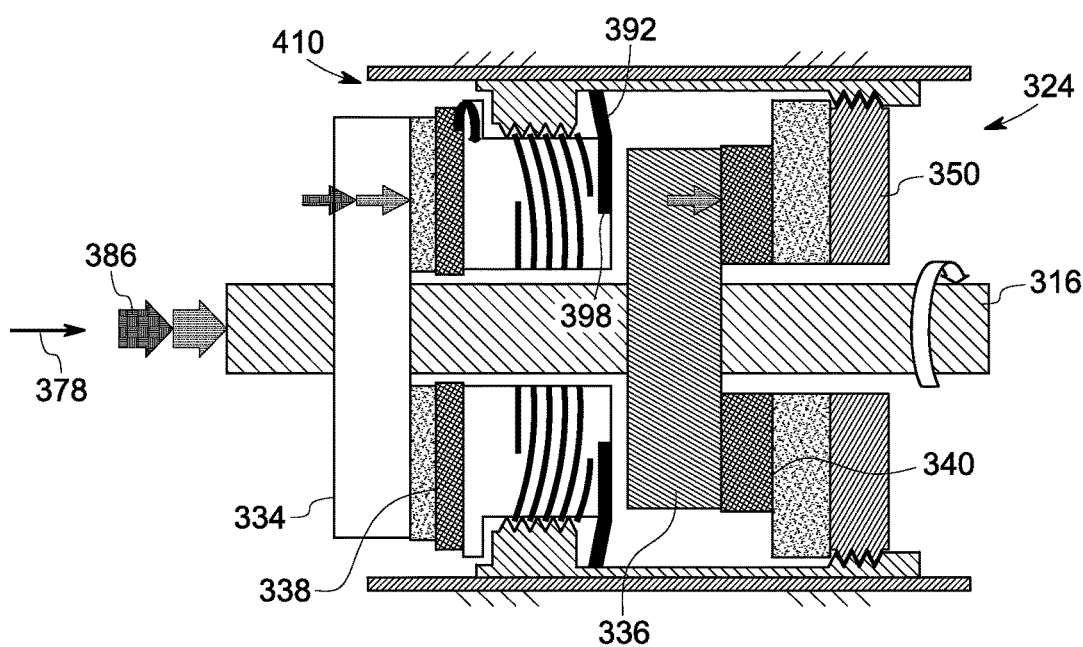
FIG. 10 is a schematic view of the seal unit having the bearing system in accordance with the exemplary embodiments of FIGS. 8 and 9.

FIG. 10 illustrates a schematic view of the seal unit 410 having the bearing system 324 in accordance with exemplary embodiments of FIGS. 8 and 9.

During operation of the electrical submersible pump, an excessive axial thrust load 386 applied on the bearing system 324, is transmitted from the first bearing unit 338 to the second bearing unit 340 via the mechanical component 342 and the flexible biasing element 392. The excessive axial thrust load 386 causes the first thrust collar 334 and the first bearing unit 338 to rotate the mechanical component 342 and thereby move the mechanical component 342 axially along with the downward movement of the shaft 316. The axial movement of the mechanical component 342 causes the flexible biasing element 392 to flex and thereby move the second thrust collar 336 against the second bearing unit 340. As a result, the axial thrust loads 376, 386 are distributed between the first and second bearing units 338, 340.

Further, during the operation of the electrical submersible pump, when the applied excessive axial thrust load 386 is less than the pre-defined load bearing capacity of the first bearing unit 338, the flexible biasing element 392 regains an original state and hence moves the mechanical component 342 along with the upward movement of the shaft 316. As a result, the mechanical component 342 is rotated to disengage the second bearing unit 340 from the second thrust collar 336, thereby regulating the distribution of the axial thrust loads 376, 386 between the first and second bearing units 338, 340.

Figure 11:
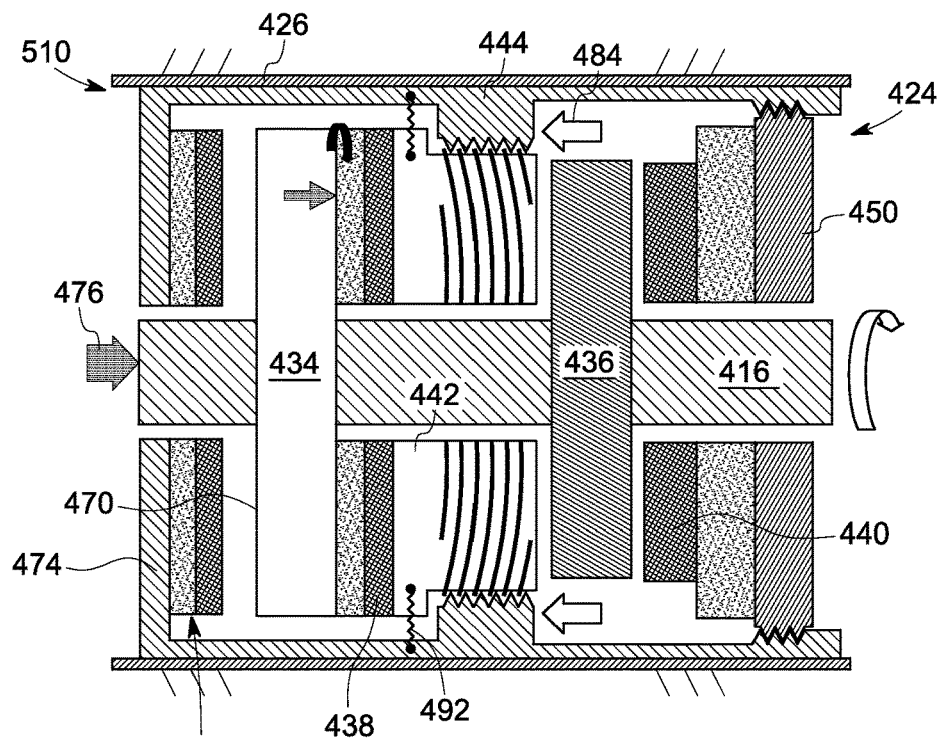
FIG. 11 is a schematic view of a seal unit having a bearing system in accordance with yet another exemplary embodiment.

FIG. 11 is a schematic view of a seal unit 510 having a bearing system 424 in accordance with yet another exemplary embodiment. The bearing system 424 includes a shaft 416, a first thrust collar 434, a second thrust collar 436, a first bearing unit 438, a second bearing unit 440, a mechanical component 442, a housing 444, a plate 450, and a flexible biasing element 492 disposed in a similarly as in the embodiments discussed above.

In the illustrated embodiment, the flexible biasing element 492 is a torsional spring. The flexible biasing element 492 is rotatably coupled to the housing 444 and the mechanical component 442 and is configured to flex during rotation of the mechanical component 442. During operation, an axial thrust load 476 applied on the bearing system 424, is initially resisted by the mechanical component 442 and the flexible biasing element 492 by applying a reactive axial thrust load 484. The axial thrust load 476 is primarily supported by the first bearing unit 438 until the axial thrust load 476 is equal to a pre-defined load bearing capacity of the first bearing unit 438. The second bearing unit 440 is not biased against the second thrust collar 436 until an actual load bearing capacity of the first bearing unit 438 exceeds the pre-defined load bearing capacity of the first bearing unit 438. The bearing system 424 further includes a third bearing unit 468 disposed proximate to a first side 470 of the first thrust collar 434 and coupled to the housing 444 via a stationary element 474.

Figure 12:
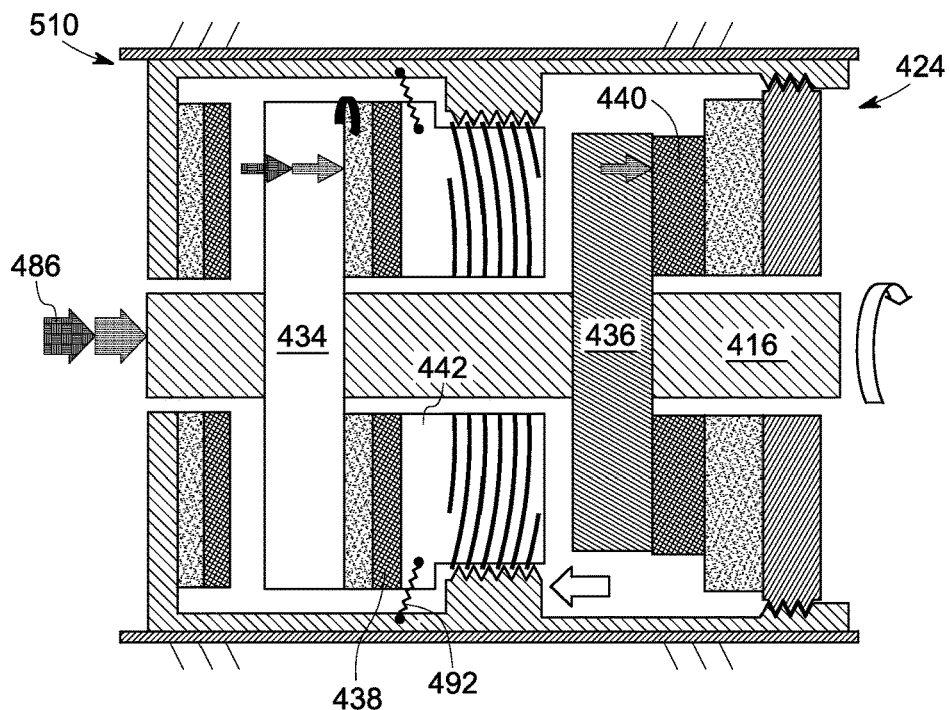
FIG. 12 is a schematic view of the seal unit having the bearing system in accordance with the exemplary embodiment of FIG. 11.

FIG. 12 illustrates a schematic view of the seal unit 510 having the bearing system 424 in accordance with the exemplary embodiment of FIG. 11. During operation of the electrical submersible pump, an excessive axial thrust load 486 applied on the bearing system 424, is transmitted from the first bearing unit 438 to the second bearing unit 440 via the mechanical component 442 and the flexible biasing element 492. The excessive axial thrust load 486 causes the first thrust collar 434 and the first bearing unit 438 to rotate the mechanical component 442 and thereby move the mechanical component 442 axially along with the downward movement of the shaft 416. The axial movement of the mechanical component 442 causes the flexible biasing element 492 to flex and thereby move the second thrust collar 436 against the second bearing unit 440. As a result, the axial thrust loads 476, 486 are distributed between the first and second bearing units 438, 440. When the applied excessive axial thrust load 486 is less than the pre-defined load bearing capacity of the first bearing unit 438, the flexible biasing element 492 regains an original state and hence moves the mechanical component 442 along with the upward movement of the shaft 416. As a result, the mechanical component 442 is rotated to disengage the second bearing unit 440 from the second thrust collar 436, thereby regulating the distribution of the axial thrust loads 476, 486 between the first and second bearing units 438, 440.

In accordance with one or more embodiments discussed herein, an exemplary bearing system facilitates to support, distribute, and regulate an axial thrust load between a first bearing unit and a second bearing unit. The excessive axial thrust load is distributed between the first bearing unit and the second bearing unit, thereby effectively regulating the thrust load applied on the bearing system. The ratio of distribution of the axial thrust load between the first bearing unit and the second bearing unit may vary depending on a diameter of the first and second bearing units. As a result, wear and tear of the bearing units is reduced.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:
1. A system comprising:
a shaft disposed at least partially within a housing;
a first thrust collar and a second thrust collar axially spaced apart from each other and coupled to the shaft, wherein at least one of the first thrust collar and the second thrust collar is disposed within the housing;
a first bearing unit disposed between the first thrust collar and a first side of the second thrust collar, wherein the first bearing unit is disposed proximate to the first thrust collar;

a second bearing unit disposed proximate to a second side opposite to the first side of the second thrust collar, wherein the second bearing unit is coupled to the housing via a plate; and
a mechanical component disposed between the first bearing unit and the second bearing unit.

2. The system of claim 1, further comprising a third bearing unit disposed proximate to a first side of the first thrust collar, wherein the first bearing unit is disposed proximate to a second side opposite to the first side of the first thrust collar.

3. The system of claim 1, wherein the first bearing unit contacts the first thrust collar.

4. The system of claim 1, wherein the plate comprises a stationary plate.

5. The system of claim 4, wherein the mechanical component comprises a flexible biasing element comprising a first end coupled to the first bearing unit and a second end coupled to the second bearing unit via the stationary plate.

6. The system of claim 1, wherein the plate comprises a threaded support plate.

7. The system of claim 6, wherein the mechanical component comprises:
 a power screw element comprising:
  a first peripheral side wall coupled to the first bearing unit;
  a second peripheral side wall disposed proximate to the first side of the second thrust collar; and
  a first set of screw elements.

8. The system of claim 7, wherein the housing comprises a second set of screw elements, wherein the second set of screw elements is engaged to the first set of screw elements.

9. The system of claim 7, further comprising a flexible biasing element rotatably coupled to the housing and the mechanical component.

10. The system of claim 9, wherein the second peripheral side wall comprises a groove, wherein the flexible biasing element is coupled to the groove.

11. The system of claim 1, wherein the first bearing unit is coupled to the housing.

12. The system of claim 11, wherein the second bearing unit contacts the second thrust collar.

13. The system of claim 12, wherein the mechanical component comprises a flexible biasing element comprising a first end coupled to the first bearing unit and a second end coupled to the second bearing unit via the plate.

14. An apparatus comprising:
 a pump;
 a motor; and
 a seal unit disposed between and coupled to the pump and the motor; the seal unit comprising:
  a casing; and
  a system comprising:
   a housing coupled to the casing;
   a shaft disposed at least partially within the housing and coupled to the pump and the motor;
   a first thrust collar and a second thrust collar axially spaced apart from each other and coupled to the shaft, wherein at least one of the first thrust collar and the second thrust collar is disposed within the housing;
   a first bearing unit disposed between the first thrust collar and a first side of the second thrust collar, wherein the first bearing unit is disposed proximate to the first thrust collar;
   a second bearing unit disposed proximate to a second side opposite to the first side of the second thrust collar; and
   a mechanical component disposed between the first bearing unit and the second bearing unit.

15. The apparatus of claim 14, wherein the first bearing unit contacts the first thrust collar.

16. The apparatus of claim 15, wherein the second bearing unit is coupled to the housing via a plate.

17. The apparatus of claim 16, wherein the plate comprises a stationary plate.

18. The apparatus of claim 17, wherein the mechanical component comprises a flexible biasing element comprising a first end coupled to the first bearing unit and a second end coupled to the second bearing unit via the stationary plate.

19. The apparatus of claim 16, wherein the plate comprises a threaded support plate.

20. The apparatus of claim 19, wherein the mechanical component comprises:
 a power screw element comprising:
  a first peripheral side wall coupled to the first bearing unit;
  a second peripheral side wall disposed proximate to the first side of the second thrust collar; and
  a first set of screw elements.

21. The apparatus of claim 20, wherein the housing comprises a second set of screw elements, wherein the second set of screw elements is engaged to the first set of screw elements.

22. The apparatus of claim 20, further comprising a flexible biasing element rotatably coupled to the housing and the mechanical component.

23. The apparatus of claim 22, wherein the second peripheral side wall comprises a groove, wherein the flexible biasing element is coupled to the groove.

24. The apparatus of claim 14, wherein the first bearing unit is coupled to the housing.

25. The apparatus of claim 24, wherein the second bearing unit contacts the second thrust collar.

26. The apparatus of claim 25, wherein the mechanical component comprises a flexible biasing element comprising a first end coupled to the first bearing unit and a second end coupled to the second bearing unit via a plate.

27. A method comprising:
 applying an axial thrust load on a system comprising:
  a shaft disposed at least partially within a housing;
  a first thrust collar and a second thrust collar axially spaced apart from each other and coupled to the shaft, wherein at least one of the first thrust collar and the second thrust collar is disposed within the housing;
  a first bearing unit disposed between the first thrust collar and a first side of the second thrust collar, wherein the first bearing unit is disposed proximate to the first thrust collar;
  a second bearing unit disposed proximate to a second side opposite to the first side of the second thrust collar, wherein the second bearing unit is coupled to the housing via a plate; and
  a mechanical component disposed between the first bearing unit and the second bearing unit;
 moving one among the first bearing unit and the second bearing unit via the mechanical component, along an axial direction of the shaft; and
 distributing the axial thrust load between the first bearing unit and the second bearing unit.

28. The method of claim 27, wherein the moving comprises:
   contacting the first bearing unit to the first thrust collar, and
   compressing the mechanical component to contact the second bearing unit to the second thrust collar, wherein the mechanical component comprises a flexible biasing element comprising a first end coupled to the first bearing unit and a second end coupled to the second bearing unit via the plate, wherein the plate comprises a stationary plate.

29. The method of claim 27, wherein the moving comprises:
   contacting the second bearing unit to the second thrust collar; and
   expanding the mechanical component to contact the first bearing unit to the first thrust collar, wherein the first bearing unit is coupled to the housing, wherein the mechanical component comprises a flexible biasing element comprising a first end coupled to the first bearing unit and a second end coupled to the second bearing unit via the plate.

30. The method of claim 27, wherein the moving comprises:
   contacting the first bearing unit to the first thrust collar;
   rotating the mechanical component within the housing, wherein the mechanical component comprises a power screw element comprising a) a first peripheral side wall coupled to the first bearing unit, b) a second peripheral side wall disposed proximate to the first side of the second thrust collar, and c) a set of screw elements; and
   flexing a flexible biasing element to contact the second thrust collar to the second bearing unit, wherein the flexible biasing element is rotatably coupled to the housing and the mechanical component.

* * * * *